Sept. 21, 1965    J. T. ELLIS, JR    3,207,270
SHOCK ABSORBER INCLUDING ADJUSTABLE METERING ORIFICES
Filed Aug. 31, 1964
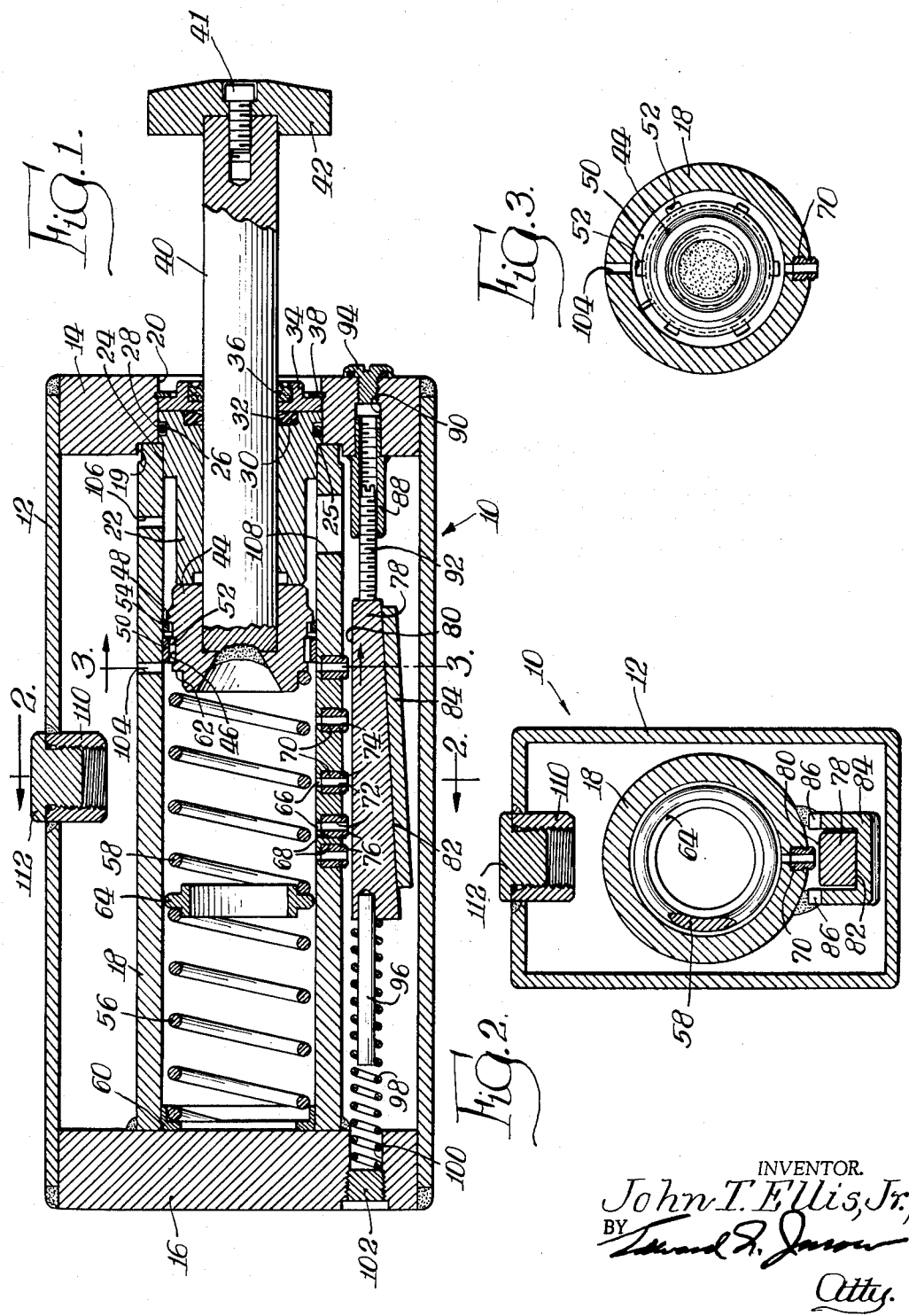
INVENTOR.
John T. Ellis, Jr.,
BY
Atty.

United States Patent Office 3,207,270
Patented Sept. 21, 1965

3,207,270
SHOCK ABSORBER INCLUDING ADJUSTABLE
METERING ORIFICES
John T. Ellis, Jr., Chicago, Ill., assignor to Ellis Fluid
Dynamics Corporation, Chicago, Ill., a corporation of
Illinois
Filed Aug. 31, 1964, Ser. No. 393,336
11 Claims. (Cl. 188—97)

My present invention relates generally to shock absorbers for use, for example, in aircraft, automative, machine and railroad applications, and more particularly to a hydraulic shock absorber having metering orifice means.

It is a primary object of my present invention to provide a hydraulic shock absorber which is capable of being adjusted to uniformly decelerate loads of differing kinetic energy quantities.

It is anothre object of my present invention to provide orifice regulating means for a hydraulic shock absorber having metering orifice means.

In the accomplishment of these objects, I propose to provide a hydraulic shock absorber comprising a pressure tube having slidably mounted therein a piston which is connected to a piston rod adapted to receive impact forces. The pressure tube is provided with bores in the wall thereof each with an extrerior seat thereabout, and a flow control member is arranged adjacent the seats whereby a plurality of annular orifices are defined therebetween. Preferably, the bores are of a uniform diameter and are spaced apart exponentially so that as the bores are successively closed off by the piston during its inward stroke the total effective orifice area decreases exponentially with the stroke of the piston. By reason of this arrangement, the shock absorber provides a uniform stopping force as well as a uniform rate of deceleration throughout the stroke. Alternatively, the same operating characteristics may be obtained by providing uniformly spaced bores of exponentially varying diameter. To permit the peripheral areas of the imaginary cylinder between the seats and the flow control member, which constitute the annular orifices, to be regulated whereby to accommodate loads or impact forces of differing kinetic energy, means are provided for moving the flow control member relative to the seats.

It is a further object of my present invention to provide a hydraulic shock absorber, as described, wherein the flow control member is in the form of a wedge member mounted for longitudinal adjustment relative to an inclined support member.

It is a further object of my present invention to provide a hydraulic shock absorber, as described, wherein the means for adjusting the flow control wedge member comprises screw means engaging one end of the wedge member for selectively moving the latter longitudinally of the support, and spring means engaging the other end of the wedge member for maintaining the latter in engagment with the screw means.

It is a still further object of my present invention to provide a hydraulic shock absorber, as described, wherein bushings are seated coaxially of the bores in the wall of the pressure tube and project outwardly thereof whereby to present annular seats lying in a common plane which together with the flow control wedge member serve to define annular orifices therebetween.

Now in order to acquaint those skilled in the art with the manner of constructing and using hydraulic shock absorbers in accordance with the principles of my present invention, I shall describe in connection with the accompanying drawing a preferred embodiment of my invention.

In the drawing:

FIGURE 1 is a longitudinal median sectional view of a shock absorber incorporating the principles of my present invention;

FIGURE 2 is a transverse sectional view of the shock absorber of FIGURE 1, taken substantially along the line 2—2 in FIGURE 1, looking in the direction indicated by the arrows; and FIGURE 3 is a partial transverse sectional view of the shock absorber of FIGURE 1, taken substantially along the line 3—3 in FIGURE 1, looking in the direction indicated by the arrows.

Referring now to the drawing, there is indicated generally by the reference numeral 10 a hydraulic shock absorber incorporating the principles of my present invention. The shock absorber 10 includes an outer housing comprised of a tube 12, which may be rectangular in cross section, a front end plate or head 14, and a rear end plate or head 16, all suitably welded in position in a conventional manner. For economy of construction, the outer tube 12 may be formed of two C-shaped channel members welded together along their longitudinal edges. Arranged within the outer housing is a cylindrical pressure tube 18 which, at its forward end, is received in an annular recess 19 formed in the inner face of the front end plate 14 and, at its rearward end, is suitably welded to the inner face of the rear end plate 16.

Mounted within a central axial opening 20 formed in the front end plate 14 is a rearwardly extending piston rod bearing 22. The bearing 22 is of stepped construction with the intermediate cylindrical portion 24 thereof being received in the forward end of the pressure tube 18 and with the annular shoulder portion 25 thereof abutting the forward end of the pressure tube 18 for axially locating the bearing 22. Formed in the outer periphery of that portion of the bearing 22 disposed within the opening 20 is an annular groove 26 in which is disposed an O-ring or seal 28 that provides a fluid seal between the bearing 22 and the front end plate 14. The bearing 22 is also provided, at its forward end, with an annular recess 30 in which is disposed an annular seal 32. Also mounted within the opening 20 in the front end plate 14 adjacent the forward end of the piston rod bearing 22 is a packing retainer 34, which serves to support an annular piston rod wiper 36, and which is maintained in position by means of a split retaining ring 38.

Slidably mounted within the piston rod bearing 22 is a piston rod 40 that projects outwardly of the pressure tube 18 and the shock absorber housing. The seal 32 and the wiper 36 engage the outer periphery of the piston rod 40 and provide a fluid seal during axial sliding movement of the piston rod 40. The outer end of the piston rod 40 has secured thereon, as by a cap screw 41, a bumper cap 42 which serves to protect the end of the piston rod 40 from repeated blows that would otherwise tend to upset the end. The inner end of the piston rod 40 has secured thereon, as by welding, a piston 44. The piston 44, at its outer periphery, is formed with an annular groove 46 and an axially spaced annular shoulder 48. Mounted within the groove 46 is a piston guide bearing 50 the outer periphery of which has sliding engagement with the inner periphery of the pressure tube 18. The guide bearing 50, at its inner periphery, is formed with a plurality of circumferentially spaced transverse slots 52 which each have a depth greater than the depth of the groove 46. Arranged intermediate of the guide bearing 50 and the piston shoulder 48 is a floating piston ring 54. The described piston and piston rod assembly and bearing means therefor are adapted to be inserted within, and withdrawn from, the shock absorbing housing, as a unit. Locking of this unit in operative position, and unlocking of the same, is accomplished by simple manipulation of the retaining ring 38.

The piston 44 is normally biased to the position shown in FIGURE 1 in engagement with the inner end of the piston rod bearing 22 by means of a pair of coil springs 56 and 58 arranged in series within the pressure tube 18. The rearward end of the spring 56 is received within an annular guide member 60 abutting the inner face of the rear end plate 16, while the forward end of the spring 58 bears against an annular recessed shoulder 62 formed in the rearward end of the piston 44. Interposed between the two springs 56 and 58 is an annular spring guide member 64 which serves to guide the springs during compression and expansion in order to prevent buckling of the springs and resultant scoring of the inner wall of the pressure tube 18.

Formed in the wall of the pressure tube 18 are a plurality of longitudinally spaced bores 66 and coaxial openings 68. Seated within the openings 68 are bushings 70 having central bores 72 of the same diameter as the bores 66. The peripheral edges of the openings 68 are crimped over into annular grooves 74 formed in the bushings 70 for securing the latter in the openings 68. In accordance with the principles of my present invention, the sets of bores 66 and 72 are of a uniform diameter and are spaced apart exponentially.

Disposed within the shock absorber housing exteriorly of the pressure tube 18 is a flow control member 78 in the form of a wedge. The wedge member 78 has an upper planar surface 80 that is arranged adjacent the seats 76 whereby to define annular metering orifices therebetween. The lower inclined surface 82 of the wedge 78 is supported on the inclined base wall of a generally U-shaped wedge cage 84. The side walls of the cage 84 are provided with slots 86, and, at their upper edges, are suitably secured, as by welding, to the adjacent exterior wall of the pressure tube 18. In order to obtain precise positioning of the wedge member 78 relative to the seats 76, the bushings 70 are first secured within the openings 68 and then the projecting ends thereof are ground parallel to the longitudinal axis of the pressure tube 18 whereby to present annular seats 76 lying in a common plane. Next, the planar surface 80 of the wedge member 78 is placed in contact with the seats 76, and the cage 84 is positioned about the wedge member 78 with the upper edges of the side walls thereof slightly spaced from the wall of the pressure tube 18. Finally, the upper edges of the side walls of the cage 84 are welded to the pressure tube 18. By reason of this method of construction, the planar surface 80 of the wedge member 78 remains paralled to the common plane of the seats 76 regardless of the longitudinal position of the wedge 78 relative to the cage 84.

The wedge member 78 is adapted to be moved longitudinally of the wedge cage 84 for adjusting the distance between the planar surface 80 and the seats 76 so as to permit uniform regulation of the size of each annular metering orifice defined therebetween. When referring herein to the size or effective area of a metering orifice, I mean the peripheral area of the imaginary cylindrical extension of the bore 72 lying between the plane of the seat 76 and the planar surface 80 of the wedge member 78. In connection with adjustment of the wedge member 84, the forward end of a sleeve member 88 is suitably secured in an opening 90 formed in the front end plate 14. Threadingly received within the sleeve member 88 is a screw member 92 which, at its rear end, is adapted to engage the forward end of the wedge member 78. The opening 90 in the front end plate 14 is closed by a suitable seal screw 94. The rear end of the wedge member 78 has secured therein a rearwardly extending spring guide pin 96 about which is disposed a coil spring 98 having engagement with the rear end of the wedge member 78. The rear end of the spring 98 extends into an opening 100 formed in the rear end plate 16 and abuts a plug member 102 threaded into the opening 100. The spring 98 serves to maintain the wedge member 78 in engagement with the adjustment screw 92.

In addition to the foregoing, formed in the upper side of the pressure tube 18 are a pair of passageways 104 and 106, and formed in the underside of the pressure tube 18 is a passageway 108. Also, a sleeve member 110 is secured, as by welding, in an opening formed in the top side of the outer tube 12 and threaded therein is a filler plug 112. Finally, to make the shock absorber of my present invention operational, the shock absorber housing is filled with hydraulic fluid to the level of the lower end of the sleeve member 110. Hydraulic fluid may be introduced into the housing through the sleeve 110 when the plug 112 has been removed.

In the operation of the hydraulic shock absorber of my present invention, impact forces received by the bumper cap 42 cause the piston rod 40 and piston 44 to move rearwardly within the pressure tube 18. As rearward movement of the piston 44 commences, pressure initially built up in the hydraulic fluid within the rearward portion of the pressure tube 18 causes the floating piston ring 54 to be forced into abutment with the piston shoulder 48 thereby preventing hydraulic fluid from flowing past the piston 44. During rearward movement of the piston 44, the hydraulic fluid within the rearward portion of the pressure tube 18 is forced outwardly thereof through the bores 66 and 72 and past the annular metering orifices defined between the bushing seats 76 and the planar surface 80 of the wedge member 78. Fluid leaving the metering orifices flows outwardly of the wedge cage 84 through the ends and the side slots 86 thereof. By metering the displacement of hydraulic fluid from the rearward portion of the pressure tube 18 in the manner described, high energy absorption or dissipation characteristics are attained. As the piston 44 moves past and closes off successive sets of bores 66 and 72, there is a reduction in the number of bores and their corresponding orifices, and hence in the total effective area of the orifices, through which hydraulic fluid can be displaced from the tube 18. At the beginning of the stroke of the piston rod 40, the total effective area of the orifices available for fluid displacement is at a maximum, while at the end of the stroke when the piston 44 has moved past all of the bores, the total effective area of the orifices available for fluid displacement is zero. Because the bores are of a uniform diameter and are spaced apart exponentially, the total effective orifice area decreases exponentially with the stroke of the piston. Therefore, the shock absorber provides a uniform stopping force as well as a uniform rate of deceleration throughout the stroke.

When the impact force is removed from the bumper cap 42, the springs 56 and 58 serve to return the piston 44 and piston rod 40 to the position shown in FIGURE 1. During such forward return motion of the piston 44, the floating piston ring 54 moves into abutment with the adjacent side of the piston guide bearing 50 thereby permitting the free flow of hydraulic fluid past the piston 44 through the bearing slots 52. At the same time, hydraulic fluid in the forward portion of the pressure tube 18 is permitted to flow outwardly thereof through the passageway 108. Accordingly, resistance to return movement of the piston 44 is minimized. The passages 104 and 106 are provided to permit the escape of any air entrapped in the hydraulic fluid.

When a load with a different kinetic energy is to be absorbed, the seal screw 94 is removed and a screw driver or like instrument is used to turn the adjustment screw 92. If the screw 92 is turned to move forwardly, the spring 98 causes the wedge member 78 to follow the screw and the planar surface 80 is moved uniformly closer to the seats 76 whereby the size of the annular orifices defined therebetween is reduced. If the screw 92 is turned to move rearwardly, the wedge member 78 is directly forced rearwardly and the planar surface 80 is moved uniformly away from the seats 76 whereby the size of the annular orifices defined therebetween is increased. After adjustment of the wedge member 78 has been made, the seal screw 94 is returned in position. During adjustment of the wedge member 78, the size of each orifice is changed uniformly. Therefore, in all normal operating positions of the wedge member 78, the total effective orifice area will always decrease exponentially with the stroke of the piston 44.

From this description, it will be appreciated that I have provided accurate and easily adjustable orifice regulating means for a hydraulic shock absorber having metering orifice means, whereby the shock absorber may be readily adjusted to uniformly decelerate loads or impact forces of differing kinetic energy. As an alternative to bores of the same diameter exponentially spaced apart, the same operating characteristics may be obtained by providing uniformly spaced bores of exponentially varying diameter. Although the hydraulic shock absorber of my present invention has been shown and described as lying in a horizontal position, it is to be understood that this shock absorber will operate equally effectively in an upright position or in any other position.

While I have shown and described what I believe to be a preferred embodiment of my present invention, it will be understood by those skilled in the art that various rearrangements and modifications may be made therein without departing from the spirit and scope of my invention.

I claim:

1. A shock absorber comprising a pressure tube, a piston axially movable within said pressure tube, a piston rod connected to said piston and extending outwardly of said pressure tube for receiving impact forces, said pressure tube having at least one through bore in the wall thereof, a wedge member having a planar surface adjacent the outer end of said bore whereby an annular orifice is defined therebetween, an inclined support for said wedge member, and means for moving said wedge member longitudinally of said support for adjusting the distance between said planar surface and said outer end of said bore so as to permit the size of the orifice to be regulated.

2. A shock absorber comprising a pressure tube, a piston axially movable within said pressure tube, a piston rod connected to said piston and extending outwardly of said pressure tube for receiving impact forces, said pressure tube having at least one bore in the wall thereof with an exterior annular seat thereabout, a wedge member having a planar surface adjacent said seat whereby an annular orifice is defined therebetween, an inclined support for said wedge member, and means for moving said wedge member longitudinally of said support for adjusting the distance between said planar surface and said seat so as to permit the size of the orifice to be regulated.

3. A shock absorber comprising a pressure tube, a piston axially movable within said pressure tube, a piston rod connected to said piston and extending outwardly of said pressure tube for receiving impact forces, said pressure tube having a plurality of longitudinally spaced through bores in the wall thereof, a flow control member having a longitudinally extending planar surface adjacent the outer ends of said bores and parallel to said pressure tube wall whereby annular orifices are defined therebetween, and means for adjustably positioning said flow control member in a manner such that said planar surface thereof is moved toward and away from said outer ends of said bores in a direction normal to said pressure tube wall so as to permit the size of all of the orifices to be simultaneously decreased or increased equally.

4. A shock absorber comprising a pressure tube, a piston axially movable within said pressure tube, a piston rod connected to said piston and extending outwardly of said pressure tube for receiving impact forces, said pressure tube having a plurality of bores in the wall thereof with exterior annular seats thereabout, a wedge member having a planar surface adjacent said seats whereby annular orifices are defined therebetween, an inclined support for said wedge member, and means for moving said wedge member longitudinally of said support for adjusting the distance between said planar surface and said seats so as to permit the size of the orifices to be regulated uniformly.

5. The shock absorber of claim 4 wherein said bores are of a uniform diameter and are spaced apart exponentially.

6. The shock absorber of claim 4 wherein said bores are of exponentially varying diameter and are uniformly spaced apart.

7. A shock absorber comprising a pressure tube, a piston axially movable within said pressure tube, a piston rod connected to said piston and extending outwardly of said pressure tube for receiving impact forces, said pressure tube having a plurality of bores in the wall thereof, bushings seated coaxially of said bores in said wall of said pressure tube and projecting outwardly thereof whereby to present annular seats lying in a common plane, a wedge member having a planar surface in a plane parallel to the plane of said seats adjacent thereto whereby annular orifices are defined therebetween, an inclined support for said wedge member, and means for moving said wedge member longitudinally of said support for adjusting the distance between said planar surface and said seats so as to permit the size of the orifices to be regulated uniformly.

8. A shock absorber comprising a housing, a pressure tube within said housing, a piston axially movable within said pressure tube, a piston rod connected to said piston and extending outwardly of said pressure tube and said housing for receiving impact forces, said pressure tube having at least one bore in the wall thereof with an exterior annular seat thereabout, a wedge member having a planar surface adjacent said seat, a support for said wedge member having an inclined base wall and side walls secured to the exterior of said pressure tube, and means for moving said wedge member within and longitudinally of said support for adjusting the distance between said planar surface and said seat so as to permit the size of the orifice to be regulated.

9. The shock absorber of claim 8 wherein said means for moving said wedge member longitudinally of said support comprises screw means carried at one end of said housing and having an end engageable with one end of said wedge member, and spring means at the other end of said housing and engaging the other end of said wedge member for maintaining the said one end of the latter in engagement with said screw means.

10. A hydraulic shock absorber comprising a housing adapted to be substantially filled with hydraulic fluid, a pressure tube within said housing, a piston axially movable within said pressure tube, a piston rod connected to said piston and extending outwardly of said pressure tube and said housing for receiving impact forces, said pressure tube having a plurality of bores in the wall thereof through which hydraulic fluid is forced when impact forces are imposed on said piston rod, bushings seated coaxially of said bores in said wall of said pressure tube and projecting outwardly thereof whereby to present annular seats lying in a common plane, a wedge member having a planar surface in a plane parallel to the plane of said seats adjacent thereto whereby annular orifices are defined therebetween for metering hydraulic fluid forced through said bores, an inclined support for said wedge member, and means for moving said wedge member longitudinally of said support for adjusting the distance between said planar surface and said seats so as to permit the size of the orifices to be regulated.

11. A hydraulic shock absorber comprising a housing, a pressure tube within said housing, a piston slidably mounted in said pressure tube by means of a guide bearing having transverse slots, a floating piston ring carried by said piston, a piston rod bearing mounted in one end of said housing and said pressure tube, a piston rod connected to said piston and extending outwardly of said pressure tube and said housing through said piston rod bearing for receiving impact forces, said pressure tube having a plurality of bores in the wall thereof, bushings seated coaxially of said bores in said wall of said pressure tube and projecting outwardly thereof whereby to present annular seats lying in a common plane, a wedge member having a planar surface in a plane parallel to the plane of said seats adjacent thereto whereby annular orifices are defined therebetween, an inclined support for said wedge member, and means for moving said wedge member longitudinally of said support for adjusting the distance between said planar surface and said seats so as to permit the size of the orifices to be regulated.

References Cited by the Examiner

UNITED STATES PATENTS

| | | | |
|---|---|---|---|
| 1,313,763 | 8/19 | Thomas | 188—88 |
| 1,373,315 | 3/21 | Dunn | 188—88 |
| 1,798,108 | 3/31 | Randolph | 188—97 |
| 2,401,275 | 5/46 | Richards et al. | 188—97 |
| 2,433,764 | 12/47 | Kottemann | 188—97 |
| 2,592,953 | 4/52 | Roberts | 251—203 |
| 2,947,511 | 8/60 | McInnes | 251—203 |
| 3,045,781 | 7/62 | Lees | 188—97 |

FOREIGN PATENTS 68,745    2/41    Czechoslovakia.

MILTON BUCHLER, *Primary Examiner.*

ARTHUR L. LA POINT, *Examiner.*